March 12, 1929.  A. A. THOMPSON  1,705,051
COMPRESSED AIR PIPE CLEANER
Filed Feb. 28, 1927

ARTHUR A. THOMPSON.
INVENTOR.

BY Harry C. Schweder
ATTORNEYS.

Patented Mar. 12, 1929.

1,705,051

UNITED STATES PATENT OFFICE.

ARTHUR A. THOMPSON, OF OAKLAND, CALIFORNIA.

COMPRESSED-AIR PIPE CLEANER.

Application filed February 28, 1927. Serial No. 171,701.

My invention relates to improvements in compressed air pipe cleaner, and it consists in the combinations, constructions, and arrangements, hereinafter described and claimed.

An object of my invention is to provide a compressed air pipe cleaner which is extremely simple in construction and which may be quickly attached to a smoking pipe and to the compressed air hose of a service station for cleaning a pipe.

Other objects and advantages will appear in the following specification, and the novel features of the invention will be particularly pointed out in the appended claims.

My invention is illustrated in the accompanying drawing, forming a part of this application, in which—

Figure 1:
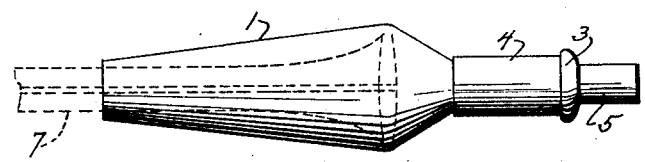
Figure 1 is a top plan view of the device.
Figure 2:
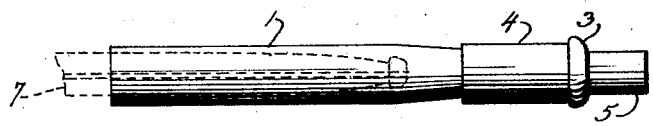
Figure 2 is a side elevation of the device.
Figure 3:
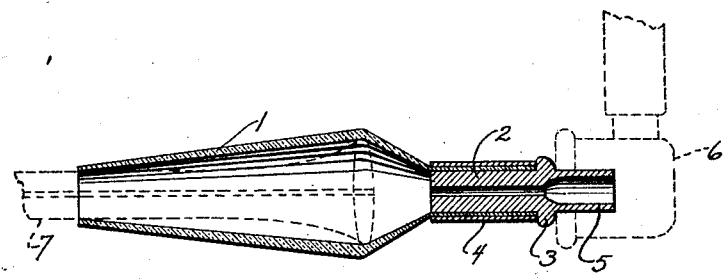
Figure 3 is a sectional view thru the device.

In carrying out my invention, I provide a flexible hose 1 preferably made of rubber and of the shape shown, and mount one end of this hose on a nipple 2. The hose is pressed on the nipple and moved until it abuts against a shoulder 3 carried by the nipple. A sleeve 4 is disposed over the nipple 2 and secures the hose to the nipple.

It will be noted from the drawing that the nipple 2 has a mouth portion 5 which is adapted to be removably disposed in a compressed air hose 6. The shoulder 3 not only acts as a stop for the hose 1 and the sleeve 4, but also acts as a stop for the compressed air hose 6.

From the foregoing description of the various parts of the device, the operation thereof may be readily understood. The flexible hose 1 is adapted to removably receive a stem 7 of a pipe. After the stem has been inserted in the hose 1, the mouth portion 5 is inserted in the compressed air hose 6. The mouth 5, of course, actuates the valve (not shown) in the compressed air hose, thus permitting air under pressure to be forced thru the stem 7 and the bowl portion of the pipe. The pressure of the air is strong enough to thoroughly clean the pipe of all foreign matter.

I claim:

1. A device of the type described, comprising a flexible hose for receiving the stem of a pipe, a nipple, a sleeve for securing said hose to said nipple, said nipple having a portion insertable into a compressed air hose, means for limiting the movement of said nipple into the compressed air hose, said means also limiting the movement of said hose and sleeve onto said nipple.

2. A device of the type described, comprising a nipple, said nipple having an annular shoulder dividing the nipple into two portions, a conical flexible hose mounted on one portion, a sleeve disposed over said hose for securing it to the nipple, the other portion of said nipple being shaped for insertion into a compressed air hose, said hose being adapted to securely hold a pipe stem therein.

3. A pipe cleaner comprising a conical flexible tube for receiving a pipe stem, a cylindrical tube extending from one end thereof; a nipple, one end thereof being disposed in said cylindrical tube, an annular collar on said nipple limiting the movement of said nipple into said tube, and a sleeve surrounding said cylindrical tube on said nipple for securing the same thereto, the other end of said nipple being adapted for insertion into a compressed air hose.

In testimony whereof I affix my signature.

ARTHUR A. THOMPSON.